(12) United States Patent
Viel

(10) Patent No.: US 11,143,244 B2
(45) Date of Patent: Oct. 12, 2021

(54) SYSTEM FOR COUPLING/UNCOUPLING ACCESSORY BOXES

(71) Applicant: SAFRAN TRANSMISSION SYSTEMS, Colombes (FR)

(72) Inventor: Julien Viel, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 71 days.

(21) Appl. No.: 16/660,175

(22) Filed: Oct. 22, 2019

(65) Prior Publication Data
US 2020/0124113 A1 Apr. 23, 2020

(30) Foreign Application Priority Data
Oct. 22, 2018 (FR) .................................. 1859738

(51) Int. Cl.
| | |
|---|---|
| *F16D 11/14* | (2006.01) |
| *F16D 28/00* | (2006.01) |
| *B64D 35/00* | (2006.01) |
| *F16D 11/10* | (2006.01) |
| *F02C 7/32* | (2006.01) |

(52) U.S. Cl.
CPC ............... *F16D 11/14* (2013.01); *B64D 35/00* (2013.01); *F16D 28/00* (2013.01)

(58) Field of Classification Search
CPC .......... F16D 11/14; F16D 28/00; F16D 11/10; F16D 2011/004; B64D 35/00
See application file for complete search history.

(56) References Cited

U.S. PATENT DOCUMENTS

| | | | | |
|---|---|---|---|---|
| 3,675,444 A | * | 7/1972 | Whipple | ................... F16D 9/02 464/160 |
| 4,569,427 A | | 2/1986 | F'geppert | |
| 4,768,634 A | * | 9/1988 | Quick | ..................... F16D 41/22 192/150 |
| 4,773,518 A | * | 9/1988 | Raad | ..................... F16D 27/118 192/69.81 |
| 8,633,665 B2 | * | 1/2014 | Charuel | .................. F16D 23/02 318/400.37 |

(Continued)

FOREIGN PATENT DOCUMENTS

| | | |
|---|---|---|
| EP | 2 199 573 A1 | 6/2010 |
| EP | 2 957 500 A1 | 12/2015 |
| WO | WO 99/47799 A1 | 9/1999 |

OTHER PUBLICATIONS

French Application No. 1859738; Search Report dated Sep. 3, 2019—9 pgs. (in French).

*Primary Examiner* — Tinh Dang
(74) *Attorney, Agent, or Firm* — Lathrop GPM LLP

(57) ABSTRACT

The present invention relates to a system for coupling an accessory box (16) of the engine (14) of an aircraft to an accessory box (12) of the aircraft, the engine accessory box being connected to a first shaft (20) inside which is slidably mounted a slide (28) carrying first coupling means (28d) capable of cooperating with second coupling means (38) carried by a second shaft (22) connected to the aircraft accessory box (12) so as to couple the first (20) and the second (22) rotating shaft, wherein it further comprises electrical means for moving the slide (28) along the axis (30) of the first shaft (20) between a first uncoupling position with the second shaft and a second first coupling position with the second shaft.

17 Claims, 1 Drawing Sheet

(56) References Cited

U.S. PATENT DOCUMENTS

2010/0283341 A1   11/2010  Grosskopf et al.
2016/0356378 A1   12/2016  Drosback
2018/0283464 A1* 10/2018  Altamura ................. F02C 7/36

* cited by examiner

SYSTEM FOR COUPLING/UNCOUPLING ACCESSORY BOXES

CROSS-REFERENCE TO RELATED APPLICATION

This application claims priority to French Patent Application No. 1859738, filed Oct. 22, 2018, which is incorporated herein by reference.

FIELD OF THE INVENTION

The present invention relates to a system for coupling/uncoupling an accessory box of an aircraft engine to an accessory box (also called accessory gear-box) of an aircraft.

TECHNICAL BACKGROUND

FIG. 1 is a functional diagram of a mechanical chain 10 for driving an accessory box 12 of an aircraft using an engine 14 of the aircraft. As is known, such a system thus includes an engine 14 whose shaft drives in rotation the equipment of an accessory box 16 necessary for the operation of the engine 14. This accessory box 16 of the engine 14 is connected to a first power transmission shaft 18 that can be coupled to, or uncoupled in rotation from a second shaft 20 connected at the input to the aircraft accessory box 12. When the aircraft accessory box 12 is in the uncoupled position of the aircraft engine 14, it can thus be started up by means of an auxiliary power engine.

The need for coupling or uncoupling capacity is explained as follows. First, coupling is necessary to start the engine since the starter is connected to the aircraft accessory box. Uncoupling is necessary for maintenance operations on the aircraft accessory box since the aircraft accessory box 12 can be rotated with the engine 14 off and its operating parameters controlled. This is a relatively common operation since it occurs about every ten flights. Also, uncoupling is required in the event of an in-flight engine failure, the aircraft accessory box 12 can continue to operate through the coupled starter powered by the auxiliary power engine. Fortunately, this event is rare and can potentially occur once every thousand flights.

In summary, when the power transmission shaft 18 or first shaft is coupled to the second shaft or input shaft of the aircraft accessory box 12, the starter power can be transmitted to the aircraft at start-up and in flight the engine can transmit power to the aircraft accessory box 12. In the absence of coupling of the first shaft 18 and the second shaft, there is no power transmission.

In a known system, it has been proposed to perform the coupling and uncoupling by means of a mechanism whose power is supplied by a hydraulic circuit from a lubrication unit operated by the aircraft accessory box 12. This type of operation requires a power supply fluid connection from the aircraft accessory box 12, which can be difficult in the event of a failure of the lubrication unit.

The invention more particularly aims at providing a simple, efficient and cost-effective solution to this problem.

SUMMARY OF THE INVENTION

This document relates to a system for coupling an aircraft engine accessory box to an aircraft accessory box, comprising a first shaft for connection to the engine accessory box and inside which is slidably mounted a slide bearing first coupling means capable of cooperating with second coupling means carried by a second shaft for connection to the aircraft accessory box so as to couple the first and the second rotating shaft, wherein it further comprises electrical means for moving the slide along the axis of the first shaft between a first position in which the first coupling means are not coupled to the second coupling means and a second position in which the first coupling means are coupled to the second coupling means.

Thus, the aircraft accessory box and the aircraft engine accessory box can be coupled to, and uncoupled from each other independently of any power supply from the aircraft accessory box or the engine accessory box. The electrical means of movement shall be connected to the aircraft electrical system and may be operated from a cockpit of the aircraft. These electrical means will be dimensioned in terms of power in such a way as to allow the first and second shafts to be uncoupled while they are in engagement with each other. The system according to the invention also has a certain compactness since the slide is mounted inside the first shaft. The electrical means for moving the slide can be formed, for example, by an electric cylinder. The design of the system according to the invention makes it possible to use only a small number of parts, which is easier to design.

The electric cylinder can be a two-way cylinder allowing the engagement and disengagement of the coupling means. It may also be possible to provide manual means for moving the slide to compensate for a failure of the electrical means of movement.

The electrical means are also designed to allow recoupling at standstill. Also, the first shaft includes a cylindrical bearing centered in an inner cylindrical surface of the second shaft.

The slide can be centered in both the first and second shafts, ensuring coaxiality between the first and second shafts. In this case, the slide may include a first cylindrical part mounted in the first shaft, coupled in rotation with it and connected to a second cylindrical part centred in a cylindrical surface of the second shaft.

In the arrangement described above, the cylindrical centering bearing surface of the first shaft in the second shaft is radially interposed between the first cylindrical part of the slide and the second shaft, further improving the coaxiality between the first shaft, the second shaft and the slide.

The first coupling means can be formed at one end of the second cylindrical part opposite to the one connected to the first part.

The slide can include a radial finger, one radially inner end of which is mounted circumferential sliding in a housing of an axially movable rod and connected to the electrical means.

The first coupling means may include first pawls carried by one end of the slide and capable of cooperating with second pawls of the second coupling means of the second shaft. The contact surfaces of the pawls have shapes that avoid/limit the disengagement of the first and second coupling means. Thus, if an in-flight uncoupling occurs in the event of engine failure, there is an inversion of the transmitted torque (the engine no longer transmits torque to the box) between the jaw clutching means, which makes it possible to reverse the forces on the anti-release shapes and thus allow disengagement. However, the presence of complementary anti-disengagement shapes on the pawls makes it difficult to disengage the pawls from one another if the engine is still running and transmitting torque. The forces of the electric actuator must overcome those of the disengagement shapes which can be very high.

The invention also relates to a system and an accessory box of an engine connected to the first shaft and an accessory box of an aircraft connected to the second shaft.

The invention still relates to an aircraft comprising a system as described above and at least one jet engine with a compressor rotor connected to the first shaft.

The invention will be better understood and other details, characteristics and advantages of the invention will appear when reading the following description, which is given as a non-limiting example, with reference to the attached drawings.

DETAILED DESCRIPTION

Figure 1:
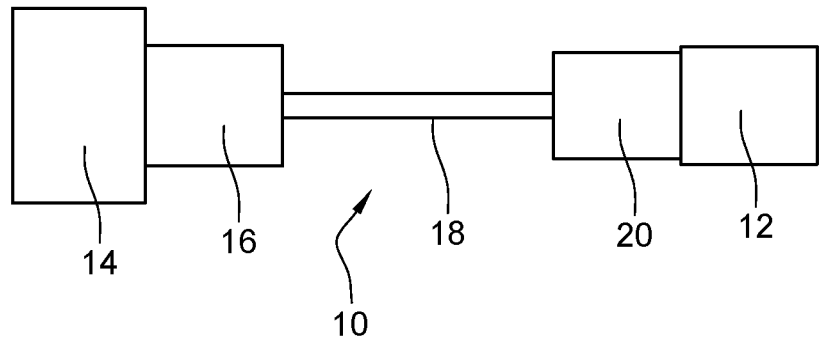
FIG. 1 already described above is a functional diagram of a mechanical drive chain of an accessory box of an aircraft using an aircraft engine.
Figure 2:
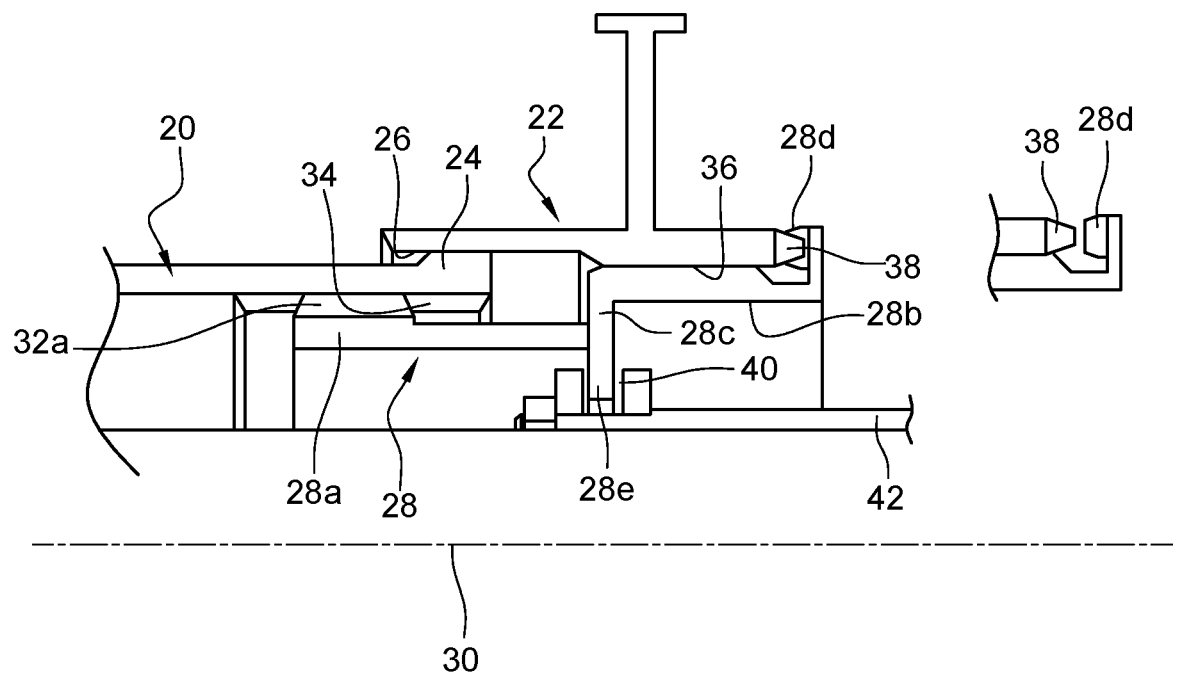
FIG. 2 is a schematic sectional view of a coupling/uncoupling system according to the invention.

Reference is now made to FIG. 2, which represents a coupling/uncoupling system according to the invention for use in a mechanical chain 10 as described in reference to FIG. 1.

The system thus includes a first shaft 20 connected to the accessory box 16 of the aircraft engine 14 and a second shaft 22 coaxial to the first shaft 20 and connected to the aircraft accessory box. The first shaft 20 comprises a cylindrical bearing surface 24 formed at one end thereof and engaged in one end of the second shaft 22. This cylindrical bearing surface 24 is supported radially outwards on an inner cylindrical surface 26 of the second shaft 22 in order to ensure a centering of the first shaft 20 in the second shaft 22. The contact is a circumferential sliding one so that the first shaft 20 can rotate independently of the second shaft 22 in the absence of rotational coupling of the two shafts 20, 22.

A slide 28 comprises a first cylindrical part 28a ensuring an axially sliding cooperation, i.e. along the axis 30 of the first shaft 20, in the first shaft 20. For this purpose, the first cylindrical part 28a of the slide 28 comprises axial splines 32a cooperating with axial splines 34 formed inside the first shaft 20. The first part 28a of the slide 28 is connected to a second part 28b which is substantially cylindrical via an annular shoulder 28c. This second part 28b ensures a circumferential sliding support on an internal cylindrical surface 36 of the second shaft 22 so as to ensure a centering of the slide 28 in the second shaft 22.

Also, the end of the second part 28b of the slide 28 carries first coupling means formed by pawls 28d which are able to cooperate with second coupling means also formed by pawls 38. The second coupling means are formed at one end of the second shaft 22 opposite the one inside which the first shaft 20 is centred.

The slide 28 includes a radial finger 28e extending radially inwards and extending the annular shoulder 28c in this direction. The radially inner end of the finger 28e is engaged by circumferential sliding in a housing 40 formed at the end of a rod 42. This finger is capable of sliding circumferentially into said housing 40. In the specific case shown in FIG. 2, the annular or circumferential housing 40 is formed at the end of a rod 42, which may be that of an electric cylinder, thus forming the electric means of movement of the slide 28. Thus, the actuation of the cylinder allows the movement and consequently the displacement of the rod 42 allows the axial movement of the slide 28 between a first position in which the first jaw clutching means 28d are arranged at a distance from the second jaw clutching means 38, the first shaft 20 and the second shaft 22 then being not coupled and a second position in which the first 28d and second 38 pawls are engaged and ensures a rotational coupling of the first shaft 20 and the second shaft 22 via the slide 28.

In another embodiment not shown, it would be possible to use a rolling bearing to move the slide 28 instead of a housing 40 as described above. In this case, the radially inner end of the finger 28e would be attached to an outer ring of the bearing and the inner ring would be attached to the rod 42.

The invention claimed is:

1. The system for coupling an accessory box of an aircraft engine to an accessory box of the aircraft, comprising a first shaft configured to be connected to the engine accessory box and inside which is slidably mounted a slide element carrying first coupling means capable of cooperating with second coupling means carried by a second shaft configured to be connected to the aircraft accessory box in order to couple the first and the second rotating shaft, wherein it further comprises a controller configured to move the slide element along the axis of the first shaft between a first position in which the first coupling means are not coupled to the second coupling means and a second position in which the first coupling means are coupled to the second coupling means, the first shaft comprising a cylindrical bearing centred in an inner cylindrical surface of the second shaft and the slide element comprising a first cylindrical portion mounted in the first shaft, rotatably coupled thereto and connected to a second cylindrical portion centered in a cylindrical surface of the second shaft.

2. The system according to claim 1, wherein the first coupling means are formed at one end of the second cylindrical part opposite that connected to the first part.

3. The system according to claim 1, wherein the slide element comprises a radial finger having a radially inner end mounted circumferential sliding in a housing of an axially movable rod able to axially move and connected to the electrical means.

4. The system according to claim 2, wherein the slide element comprises a radial finger having a radially inner end mounted circumferential sliding in a housing of an axially movable rod able to axially move and connected to the electrical means.

5. The system according to claim 1, wherein the first coupling means comprise first pawls carried by one end of the slide element and adapted to cooperate with second pawls of the second coupling means of the second shaft.

6. The system according to claim 2, wherein the first coupling means comprise first pawls carried by one end of the slide element and adapted to cooperate with second pawls of the second coupling means of the second shaft.

7. The system according to claim 3, wherein the first coupling means comprise first pawls carried by one end of the slide element and adapted to cooperate with second pawls of the second coupling means of the second shaft.

8. The system according to claim 4, wherein the first coupling means comprise first pawls carried by one end of the slide element and adapted to cooperate with second pawls of the second coupling means of the second shaft.

9. An assembly comprising the system according to claim 1 and the accessory box of an engine connected to the first shaft and the accessory box of an aircraft connected to the second shaft.

10. An assembly comprising the system according to claim 2 and the accessory box of an engine connected to the first shaft and the accessory box of an aircraft connected to the second shaft.

11. An assembly comprising the system according to claim 3 and the accessory box of an engine connected to the first shaft and the accessory box of an aircraft connected to the second shaft.

12. An assembly comprising the system according to claim 4 and the accessory box of an engine connected to the first shaft and the accessory box of an aircraft connected to the second shaft.

13. An assembly comprising the system according to claim 5 and the accessory box of an engine connected to the first shaft and the accessory box of an aircraft connected to the second shaft.

14. An assembly comprising the system according to claim 6 and the accessory box of an engine connected to the first shaft and the accessory box of an aircraft connected to the second shaft.

15. An assembly comprising the system according to claim 7 and the accessory box of an engine connected to the first shaft and the accessory box of an aircraft connected to the second shaft.

16. An assembly comprising the system according to claim 8 and the accessory box of an engine connected to the first shaft and the accessory box of an aircraft connected to the second shaft.

17. An assembly comprising the system according to claim 9 and the accessory box of an engine connected to the first shaft and the accessory box of an aircraft connected to the second shaft.

\* \* \* \* \*